(12) United States Patent
Armanous-Dib

(10) Patent No.: US 10,786,340 B2
(45) Date of Patent: Sep. 29, 2020

(54) JET BRUSH

(71) Applicant: Alexandro Armanous-Dib, Castle Donington (AU)

(72) Inventor: Alexandro Armanous-Dib, Castle Donington (AU)

( * ) Notice: Subject to any disclaimer, the term of this patent is extended or adjusted under 35 U.S.C. 154(b) by 0 days.

(21) Appl. No.: 15/947,608

(22) Filed: Apr. 6, 2018

(65) Prior Publication Data
US 2018/0333242 A1 Nov. 22, 2018

(30) Foreign Application Priority Data

May 17, 2017 (AU) .................................. 2017100552

(51) Int. Cl.

| | | |
|---|---|---|
| A46B 11/04 | (2006.01) | |
| A61C 17/36 | (2006.01) | |
| A61C 17/22 | (2006.01) | |
| A61C 17/02 | (2006.01) | |
| A46B 7/04 | (2006.01) | |
| A46B 11/00 | (2006.01) | |

(52) U.S. Cl.
CPC .............. *A61C 17/36* (2013.01); *A46B 7/042* (2013.01); *A46B 11/0062* (2013.01); *A46B 11/0065* (2013.01); *A61C 17/0202* (2013.01); *A61C 17/227* (2013.01); *A46B 2200/1066* (2013.01)

(58) Field of Classification Search
CPC .............. A46B 11/002; A46B 11/0065; A46B 2200/1026; A46B 2200/1066; A46B 7/042; A61C 17/36; A61C 17/227; A61C 17/02; A61C 17/0202; A61C 15/047; A61C 15/048
See application file for complete search history.

(56) References Cited

U.S. PATENT DOCUMENTS

| | | | | |
|---|---|---|---|---|
| 8,317,424 | B2 * | 11/2012 | Chenvainu | A61C 1/0061 401/188 R |
| 8,398,325 | B2 * | 3/2013 | Wu | A46B 11/0006 401/188 R |
| 9,022,960 | B2 * | 5/2015 | Fougere | A46B 9/045 601/163 |
| 9,445,661 | B2 * | 9/2016 | Wu | A46B 11/0006 |
| 10,034,731 | B2 * | 7/2018 | Chang | A61C 17/0202 |
| 2006/0078844 | A1 * | 4/2006 | Goldman | A61C 1/0084 433/80 |
| 2009/0060622 | A1 * | 3/2009 | Lian | A61C 17/3445 401/28 |

FOREIGN PATENT DOCUMENTS

GB 2445177 A * 7/2008 ......... A61C 17/0202

* cited by examiner

*Primary Examiner* — Jennifer C Chiang
(74) *Attorney, Agent, or Firm* — Law Office of Jeff Williams LLC; J. Oliver Williams

(57) ABSTRACT

An electric tooth brush is equipped is equipped with a water or other fluid dispensing jet function. The fluid is contained in a replaceable capsule inserted into the body of the tooth brush. The capsule contains antibacterial cleaning solution. The bristles are replaceable to enable the product of the invention to be long lasting. It has advantages over the standard electric toothbrush because of the water jet aspect, which gives a more thorough clean and eliminates the need for separate flossing by providing a flossing effect.

4 Claims, 2 Drawing Sheets

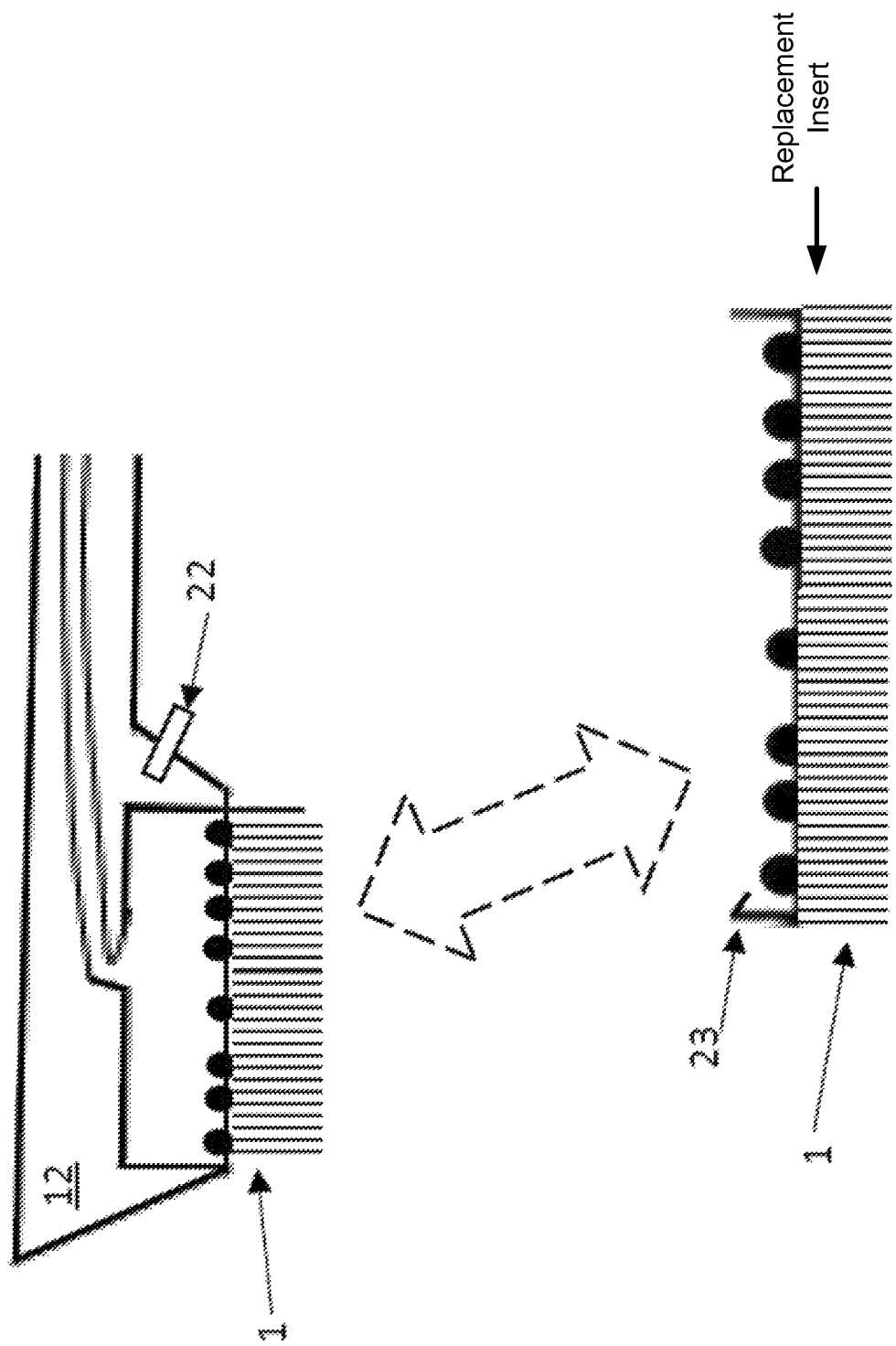

JET BRUSH

CLAIM OF PRIORITY

This application claims the benefit of Australian Application No. 2017100552, filed 17 May 2017. The information contained therein is hereby incorporated by reference.

BACKGROUND

1. Field of the Invention

The invention is in the field of dental devices and oral hygiene and provides an electrically powered toothbrush with a combined cleaning and flossing effect.

2. Description of Related Art

Technical health problems that are known to develop from brushing with a standard tooth brush include:
Cavities—from improper cleaning techniques
Worn tooth enamel from abrasive cleaning with standard toothbrushes
Fillings from not thoroughly cleaning the tooth enamel.
Gum disease from bacteria left over from standard tooth brushes not being able to reach in between teeth.
Tissue replacement from growth build-up of bacteria and abrasive cleaning which damages the gum line.
Gingivitis Electric toothbrushes are well known. Numerous examples include means for discharging a fluent material in the form of a liquid or a paste from a brushing head. Reference may be made to patent number EP 2793741, which discloses a water dispensing nozzle built in to an electric tooth brush and which does not need to be connected to an outlet, because it has an internal reservoir. It does not discharge water in a jet.

Application publication US 2010/0278582 discloses the dosing, in discrete amounts, of a substance for dental treatment. It teaches that the substance is discharged or dispensed at rates that vary from a relatively higher rate initially to a lower rate later.

Patent application publications US 2009/0136285 discusses a pump having a modified to permit use of pressures up to 200 psi to handle different dentifrices. It does not discuss the manner of their discharge. It can be imagined that dentifrices in paste form would require higher pressures than a liquid to effect their discharge.

International publication WO 2016/185162 discloses tooth treatment apparatus in which a liquid is discharged in a series of short bursts, rather than a continuous stream.

U.S. Pat. No. 6,735,803 discloses an electric toothbrush that is configured for dispensing toothpaste (dentifrice material) through the brush head. The tooth paste is delivered to the brush head in a continuous flow path to the brush head, but not in a continuous flow stream along the path, and is not taught that it is in the form of a jet when being discharged.

U.S. Pat. No. 5,309,590 provides for the dispensing of a fluid dentifrice using a pump or other pressurizing means. For example, the fluid to be discharged may be stored in a reservoir that is pressurized to aid the flow of fluid from it. There is no teaching that delivery pressure sufficient to discharge the dentifrice in a continuous constant jet is developed, or is even required. Indeed, the word "drop" is used in connection with fluid discharge. It is also important that fluid discharge is dependent on the bristles being in vibrating mode. This teaches away from a constant flow stream (or jet). The mechanism of fluid dispersion is explained as a combination of capillary action and centrifugal force developed when the bristles, through which dentifrice liquid flows, vibrate. There is no constant or continuous stream, as the fluid is sucked into the bristles, not forced through them, and when discharged from the tips of the bristles, the fluid will be dispersing in different, oscillating directions and under centrifugal acceleration—not in a constant or continuous stream.

The broken, disrupted or intermittent flow of the devices above tend to result in discomfort for the user and may lead to unnecessary wearing away of tooth enamel and impacts on the gums causing longer term gum damage. A gentler solution is required, preferably that includes a flossing effect.

In this specification, the words 'comprise', 'comprising', and the like are to be construed in an inclusive sense—that is to say, in the sense of "including, but not being limited to"—as opposed to an exclusive or exhaustive sense—meaning "including this and nothing else".

SUMMARY OF THE INVENTION

According to the invention, there is provided a fluid-dispensing electric toothbrush comprising a bristled teeth-cleaning brush head, a base portion to which the brush head is operatively attached, a capsule within the base portion and in fluid communication with the brush head, the capsule being chargeable with liquid for application to a user's teeth via the brush head, jet-generating means operable to cause liquid from the capsule to be discharged in a jet from the brush head to the user's teeth, whereby a flossing-like effect is obtainable by means of the jet, while a tooth is being brushed with the bristled brush head.

DESCRIPTION OF THE DRAWINGS

In order that the invention may be better understood, reference will be made to the preferred embodiment schematically illustration in the following drawings:

FIG. 2 is a partially exploded view of a brush head of the embodiment of FIG. 1.

Figure 1:
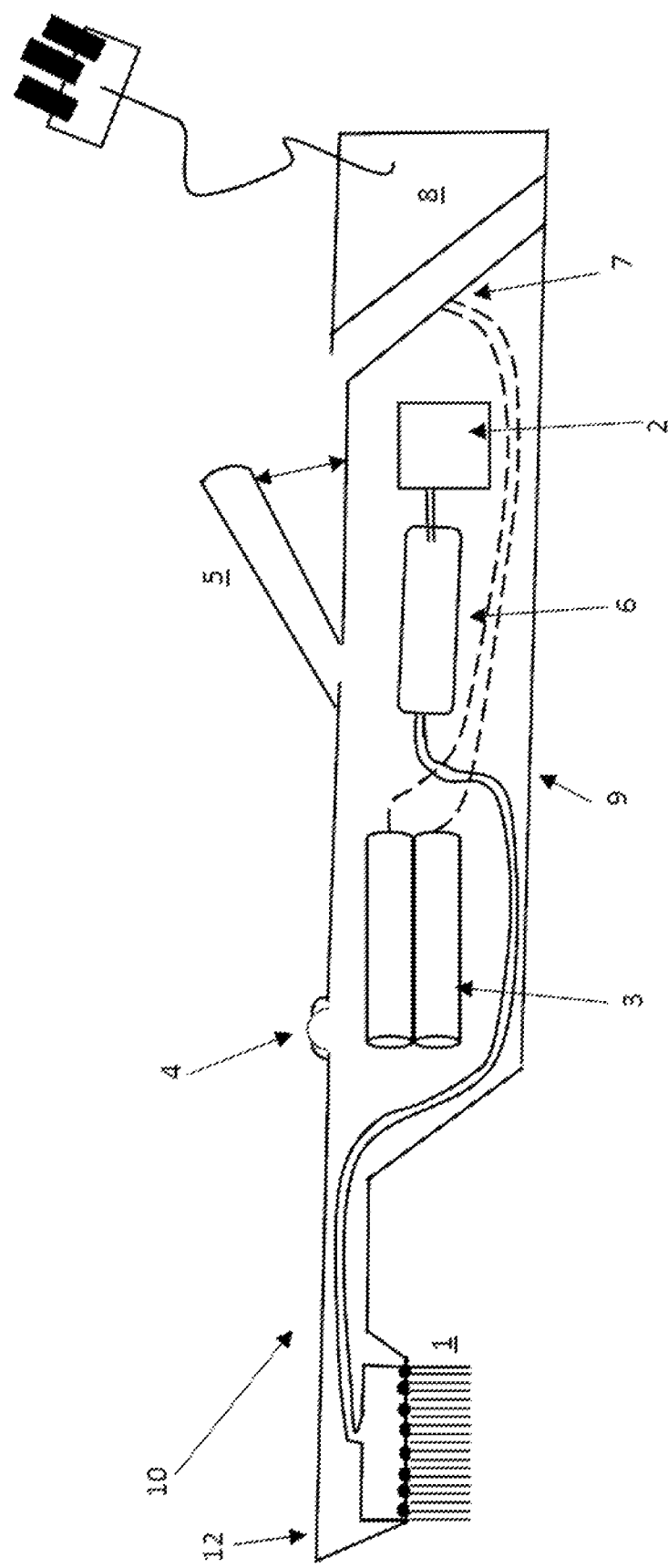
FIG. 1 is a schematic side view of a jet brush of the present application in a preferred embodiment.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The jet brush of this invention is a tooth brush with the benefits of a water jet. Referring to accompanying FIG. 1, water is dispersed from the bristles 1 of brush 10 by pressure from a built in micro-pump 2 or pressure membrane that is inside the body 9 of the tooth brush.

As shown in FIG. 2, the bristles 1 are detachable by releasing clips 23 and a replacement insert can be put into use by ejecting the used bristles 4 of the tooth brush head 12, by actuation of release lever 22.

Returning to FIG. 1, a battery 3 inside the toothbrush is rechargeable via a charging point 7 that docks to a charger base 8, which connects in turn to a mains outlet. There is a lid 5 that can be opened to insert the anti-bacterial cleaning solution capsule 6.

The jet brush has a multi-speed water jet setting 4 and can go from a gentle clean to a more intensive clean from the touch of a button. The invention of the jet brush came from the inventor's realization that such a device would eliminate the need for a user to floss after brushing, saving time and giving a more thorough clean.

Using the tooth brush of the invention enables a user to brush and floss simultaneously.

The jet/brush combined function cleans the teeth and gums more gently than the standard tooth brush, which lowers the risk of worn tooth enamel and gum damage.

A capsule of liquid or gel antibacterial cleaning solution is inserted into the jet brush body. The liquid dispensed through the bristles gives the teeth a flossing effect while brushing occurs at the same time.

The jet brush of this invention advantageously eliminates the need to floss and is an effective and hygienic way to clean teeth. It is effective in removal of plaque and bacteria and is gentle on the gums.

The embodiments described herein illustrate particular non-limiting examples of the method of use of apparatus of the invention providing means for dental cleansing. With the insight gained from this disclosure, the person skilled in the art is well placed to discern further embodiments by means of which to put the claimed invention into practice.

What is claimed is:

1. A fluid-dispensing electric toothbrush comprising:
   a bristled teeth-cleaning brush head;
   a base portion to which the brush head is operatively attached; a capsule within the base portion and in fluid communication with the brush head, the capsule being charged with liquid for application to a user's teeth via the brush head; and
   jet-generating means operable to discharge said liquid in a liquid only stream that is continuous and pressurized at all times from the brush head to the user's teeth; whereby a flossing-like effect is obtainable by means of the continuously-discharged liquid stream, while a tooth is being brushed with the bristled brush head.

2. The toothbrush of claim 1 wherein the jet generating means comprises a micro pump.

3. The toothbrush of claim 1 wherein the capsule is replaceable.

4. The toothbrush of claim 1 wherein the brush head comprises a replaceable insert comprising bristles.

* * * * *